June 14, 1960
E. SCHLUETER
2,940,558
ANGULAR HOLE FASTENING DEVICE
Filed March 2, 1956
2 Sheets-Sheet 1
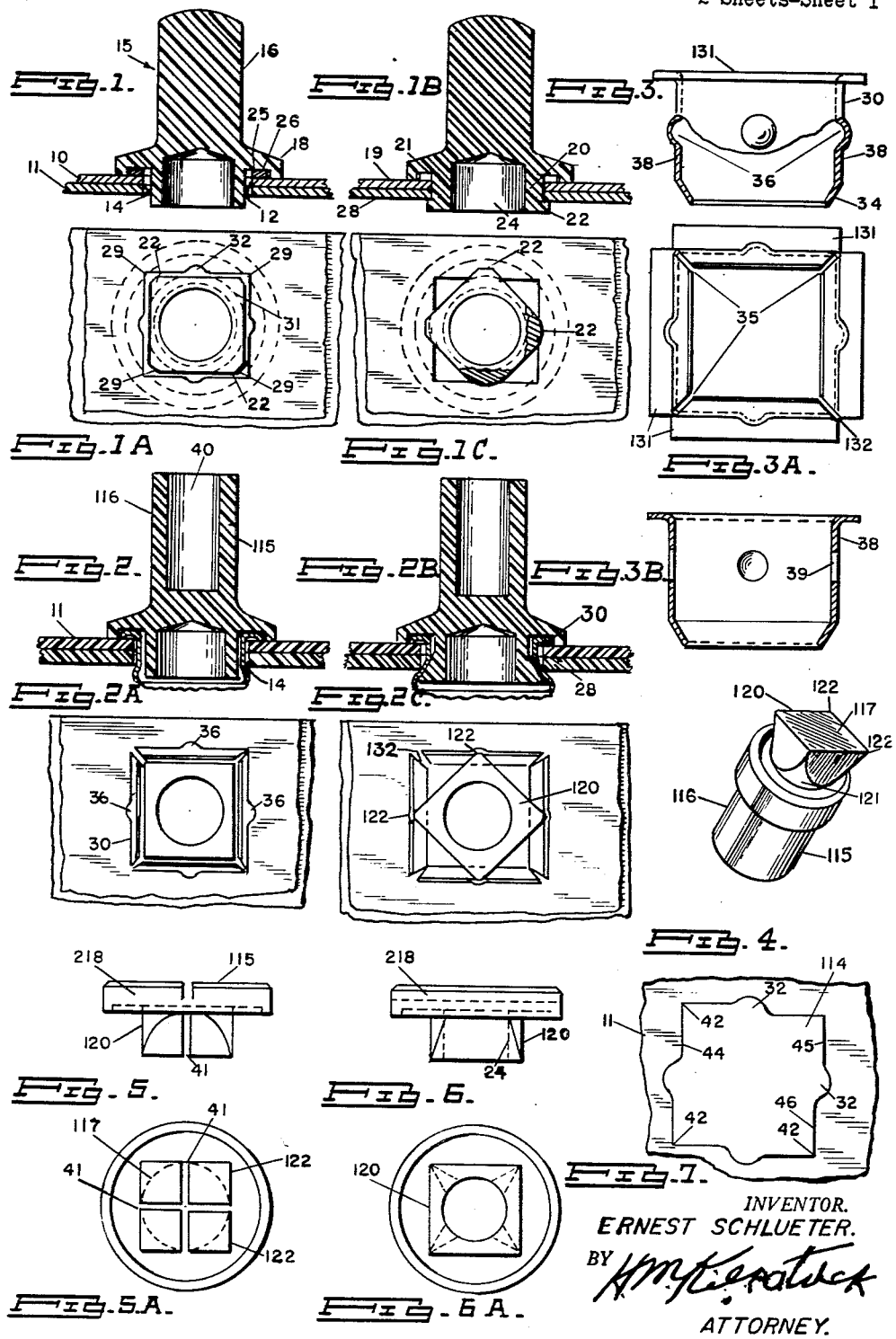

June 14, 1960     E. SCHLUETER     2,940,558
ANGULAR HOLE FASTENING DEVICE
Filed March 2, 1956     2 Sheets-Sheet 2
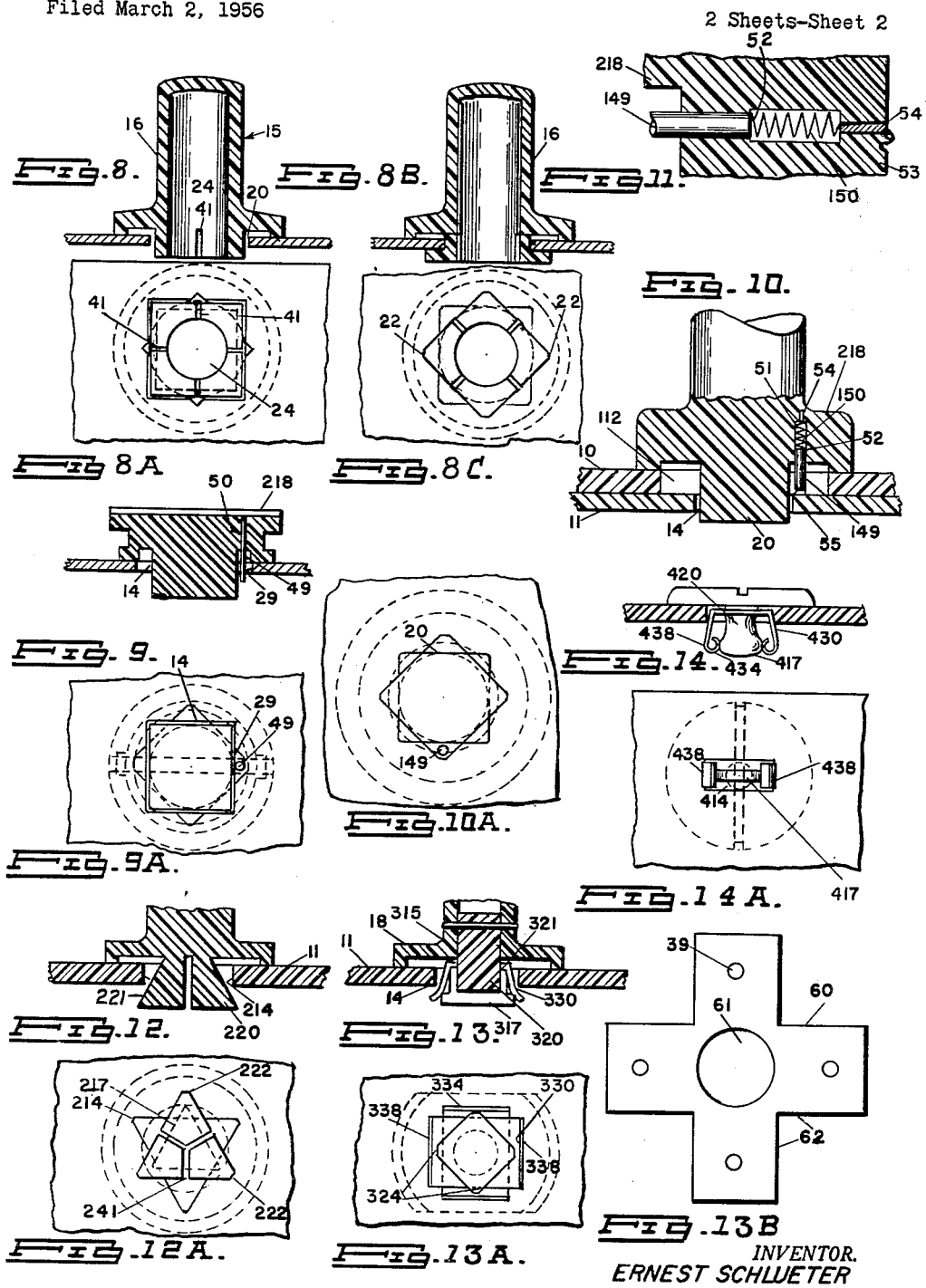
INVENTOR.
ERNEST SCHLUETER
BY *H. M. Kilpatrick*
ATTORNEY.

United States Patent Office 2,940,558
Patented June 14, 1960

2,940,558
ANGULAR HOLE FASTENING DEVICE
Ernest Schlueter, R.F.D. 4, Troy, N.Y.
Filed Mar. 2, 1956, Ser. No. 569,014
11 Claims. (Cl. 189—36)

This invention relates to turnable fasteners and fastening devices, which may be used to fasten plates and the like together or which may be secured to a single plate-like body.

One object of the invention is to provide a simple fastener which requires no threads and can be secured to a plate-like body accessible from only one face.

Another object is to provide such a fastener that may be made fast in a blind hole by partial rotation.

Still another object is to provide such a fastener that may be removed, if desired.

Yet another object is to provide such a fastener that may be securely locked in position.

And still another object is to provide a fastener which may be made as only one integral part and which may be molded or easily machined the required size and shape.

These and other objects which will be particularly apparent from the description are attained as shown in connection with a fastener having at one end portion a stud having a square or triangular cross section at its zone of maximum radial dimension and a rounded shank of reduced diameter. The other end portion is of greater diameter than the maximum effective stud diameter. The stud, in use, passes through a keeper plate having a hole of the general configuration of said cross section, but larger and angularly displaced. Portions of the stud may engage directly on the keeper plate or force a grommet between the stud and plate to engage the latter.

In the accompanying drawing showing, by way of example, several of many possible embodiments of the invention, Figs. 1 and 1A are diametric sectional and bottom views of one form of the fastener in unlocked position;

Figs. 1B and 1C show the fastener of Figs. 1 and 1A in locked position;

Figs. 2 and 2A are diametric sectional and bottom views of another form of the fastener in unlocked position;

Figs. 2B and 2C show the fastener of Figs. 2 and 2A in locked position;

Figs. 3 and 3A are a sectional view and plan respectively of an expansion member;

Fig. 3B shows a modification of the member of Figs. 3 and 3A;

Fig. 4 is a perspective of the fastener of Figs. 2–2C;

Figs. 5 and 5A are front and bottom elevations of another form of the fastener;

Figs. 6 and 6A are front and bottom elevations of yet another form of the fastener;

Fig. 7 is a fragmental plan of a plate provided with a modified keeper hole for receiving the fastener;

Figs. 8 and 8A are diametric sectional and bottom views of another form of fastener shown in unlocked position;

Figs. 8B and 8C are corresponding views of the fastener in Figs. 8 and 8A shown in locked position.

Figs. 9 and 9A are a partially diametric sectional view and bottom respectively showing pin means for locking the fastener against rotation;

Figs. 10 and 10A show a spring biased pin for locking the fastener against rotation;

Fig. 11 shows details for anchoring spring of Fig. 10;

Figs. 12 and 12A show a fastener having a triangular faced stud head;

Figs. 13 and 13A are sectional and bottom views showing the fastener with another form of expansion member;

Fig. 13B shows a blank for forming the expansion member of Figs. 13 and 13A; and Figs. 14 and 14A are diametric sectional and bottom views of yet another form of the invention.

The invention as shown in Figs. 1–1C is shown in combination with upper and lower plates 10 and 11 in face-to-face contact having substantially square holes 12 and 14 of approximately the same size, the latter being termed a keeper hole. A fastener 15 holds the plates together and includes an upwardly extending stem 16 provided with an outstanding radial flange 18 extending over the top face 19 of the upper plate and a downwardly projecting stud 20 or stud portion passing through said holes.

The stud has an approximately cylindrical rounded portion 21 at the zone within the holes, the maximum diameter of the rounded portion being normally slightly greater than the minimum diameter of the square keeper hole 14. The hole 12 may be of almost any size and shape provided the flange can substantially cover it and the stud pass through it. The outer end of the stud is provided with four equally spaced radially projecting lugs 22 sufficiently long to extend over the side marginal portions of the hole and sufficiently short to pass through the corner zones of the holes. The stud portion may be provided with a hollow cavity 24 to increase resiliency of the stud portion, and the flange 18 provided with circular groove 25 opening toward the plates, to receive a resilient ring 26. The latter engages against the top face 19 and tends to expel the fastener from the holes and thereby urges the lugs 22 against the bottom face 28 of the lower plate. If the material of fastener or plates is sufficiently resilient the cavity 24 may be omitted as may the groove and ring.

In use, the stud portion is passed through the holes, the fastener being in such position that the lugs pass through the hole corners 29 of the keeper hole as in Fig. 1A. Force is applied so that the lugs 22 in a common plane clear the lower plate 11. The fastener is then rotated about 45° to locking position as shown in Figs. 1B and 1C.

One way of forming the stud as shown, which way will aid in the description, is to initially form the stud with substantially square cross section and size so as to just easily pass through the hole 14 in the lower plate. The portions under each corner end portion of the stud are cut out along cylindrical surfaces 31, leaving the corner ends as the lugs 22, having flat inner faces to engage flat on the face of plate 11. The diameter of the stud at the surfaces 31 is slightly greater than the lengths of the sides of the hole 14 and greater than at zones between the surfaces 31, so as to produce a tight fit when the fastener is in locked position. The mid portions of the marginal portion about the hole 14 may be provided with detent notches 32 to receive the maximum diameter portions of the stud to hold the fastener against rotation.

The fastener and plates may either or both be of suitable material such as metal or plastic, and the upper plate may be omitted if the function of the fastener is only to fasten itself as a knob or the like to a plate, as shown in Figs. 8 and 13 for instance.

The fastener 115 is generally similar to the fastener 15 except that its stud portion 120 is not provided with a cylindrical portion similar to 21 of fastener 15. Instead, the square end 117 (Fig. 4) of the stud is conically undercut as at 121 to form camming surfaces which tend to draw the fastener 115 into square keeper hole as the stud is rotated.

The square corner portions 122 of the stud 120 not only may function in the same manner as the lugs 22 of fastener 15 but may coact with a grommet 30 which may be inserted in the square keeper hole 14 of plate 11 (Figs. 2–2C) or in the hole of a pair of plates as in Fig. 1. By use of a grommet, the hole and stud sizes need not be as accurately proportioned as when no grommet is used.

The grommet 30 of Figs. 3 and 3A is an expansive sleeve of square cross section having one or more outstanding flange members 131 at its outer end engaging the top face of plate 11 (Fig. 2). The grommet or sleeve is open at one corner edge as at 132 to permit expansion of the grommet when the stud 120 is inserted and rotated. Preferably the inner end of the grommet is provided with inwardly sloped flanges 34 which engage the stud 120 as the latter is inserted so as to partially expand the inner end of the grommet before any rotation is effected. This will be facilitated, if metal is used, by having slots in the sleeve corner-edges 35 extending from the flanges 34 toward the flanges 131. If the grommet is of non-brittle plastic or soft metal sheet, such as aluminum, no slots are needed.

When the fastener is rotated 45° to the locked position as in Figs. 2B and 2C, the stud corners 122 engage in detent pockets 36 in the grommet sides 38 or in detent holes 39 (Fig. 3B) to prevent unintentional rotation to unlocked position.

It can be seen that the expansion of the inner end of the grommet partially clinches the sides 38 against the lower face 28 of the plate 11. Of course if the stud 120 and plate hole 14 are properly proportioned the grommet may be omitted.

The stem 116 of the fastener 115 may be provided with a cavity 40 in which some element, say a rod, may be mounted.

The nature of the stem may vary considerably, so that the stem with the flange 18 becomes a cap 218 (Fig. 5) of the fastener 115 having the same type of stud 120 as shown in Fig. 4 except for its being provided with medial radial slots 41 to increase yieldability of the stud during rotation. The slots preferably meet the edges of the square stud end 117 most remote from the diagonals. Yieldability to the stud 120 may be improved by the provision of the cavity 24 of Fig. 1 as shown in Fig. 6.

To prevent the stud either 20 or 120 from being turned more than 45° the keeper hole 114 (Fig. 7) in the inner (or lower) plate 11 may have detent notches 32 (shown exaggerated as in Fig. 1) but the hole is not square as is that of Fig. 1 but it does have four right angular corners 42 and four similar side boundaries 44 each side boundary 44 having two parallel edge lines 45, 46 at different distances from the geometric center of the hole. In passing around the perimeter of the hole, the edge lines are alternately nearer and farther from the hole center to enable an easier turning of the stud therein in one direction rather than the other.

The cavity 24 of the stud of Fig. 1 may extend well up into the stem 16 as shown in Figs. 8–8C and the stud 20 may be provided with the diametric slots 41 as in the stud 120.

When it is desired that the fastener be locked against rotation in a more positive manner than by the resilient engagement of the stud in the detents 32 I may pass a pin 49 through the flange 18 or cap 218 as shown in Figs. 9–9A so as to project into a corner 29 of the hole 14. The pin may be inserted to give a forced fit in a bore 50 passing through the cap 218 after the fastener is in locked position.

In another form of the invention similar to that shown in Fig. 10, the pin 149 (Fig. 10) is received in a bore 150, but is biased to be urged into the hole corner by a spring 51 within the bore. One end of the spring is secured to the pin as at 52 while the other is secured to the flange or cap 218 in a known manner as through a swaged pin hole 54 closed by punch prick 53.

In Fig. 10 the hole 112 in the upper plate 10 is shown larger than the hole 14 and this is possible and permissible in all forms of the invention provided the flange cover the hole.

In operation of the invention according to Fig. 10 as the stud 20 enters the hole 14 the marginal portion 55 thereof causes the pin 149 to be pushed further into the bore 50 against the compression spring 51. The fastener is then rotated until the pin finds a corner such as 29 in the keeper hole 14 and the spring then injects the pin into the corner.

While I have shown the various studs to have square ends with partially cylindrical and conical shanks the stud 220 of Figs. 12 and 12A has a triangular end 217 and sharper (60°) corners undercut in frusto-conical fashion to provide camming surfaces 221. The keeper hole is equilateral. Slots 241 radial to the stud axis improve the resilience of the stud in a manner described of other forms of the invention.

In yet another form of the invention as shown in Figs. 13–13B, somewhat similar to that shown in Fig. 2 the fastener 315 normally carries an expansion or clinching member 330 of bendable material somewhat similar to the grommet 30. The clinching member is formed from a blank 60 of Swiss cross shape having a central hole 61. The cross arms 62 are all bent in the same direction to form a cubical shape similar to the grommet but preferably without the inturned flanges 34 of the latter. The stud 320 of the fastener passes through the central hole 61 and is free to rotate therein. The stud portion 321 within the hole 61 may be cylindrical. The clincher member is retained on the portion 321 by a square end-head 317 as an integral part of the stud, or fast with respect to the portion 321 and the usual flange 18. The clinching member sides formed from cross arms 62 and the cylindrical portion 321 are so proportioned that the sides 338 may project beyond or as far as the end-head 317 so that the latter may flare the end parts 334 of the side members 338, when the end head is rotated 45° to the position as shown. If the clinching member be of metal it is desirable that the portion 321 and head 317 also be of metal.

In use the clinching member 330 is normally carried on the fastener with the sides 338 parallel to the stud axis and surrounding the head 317. The member 330 is then inserted in the square hole 14 and fastener pushed in the stud portion 321 being sufficiently long for the head to clear the plate 11. The stud is then rotated to locking position clinching and flaring the sides to prevent withdrawal of the member 330 and the stud held by it. Detent holes 39 may be provided in the arms 62, which are the sides 338, to prevent rotation of the head.

The expansion member need not have as many as four sides. Figs. 14 and 14A show an expansion member 430 similar to that shown in Fig. 13 except that it is provided with only two sides 438, and is for use in a rectangular keeper hole 414. The sides 438 are flared by rotation of a head 417 of somewhat the shape of a keg handle. The sides 438 may be provided with inturned projections 434 to reduce the width of the head and the torque required to turn the fastener. In a similar manner the torque required may be reduced in the forms shown in Figs. 13 and 2.

The fasteners may be put to almost innumerable uses such as knobs on which to mount refrigerator shelves, as adjustable book shelf supports, rod supports, bearings (especially when nylon plastic is used for the stud material and the fastener has a bore cavity).

The forms as shown in Figs. 5 and 6 having a low flat cap are desirable to cover an unused hole. The fastener in general may be used as cowl fasteners and the like.

If the stud is of sufficiently resilient material, such as nylon plastic, and the keeper is even hard as metal the grooves and ring may be omitted. Other plastics having similar physical properties may be used.

In Fig. 10 the detent member 149 may be cast integral with the flange 218 and project only slightly below the same and into the hole 112. The resilience of the flange and member 149 and even that of the plate 10 enables the member to ride over the plate when the fastener is inserted and rotated when the member reaches the hole corner it enters the hole in the same manner, but to a lesser extent, as shown in Fig. 10.

The invention claimed is:

1. In combination, a plate having a hole therein; the main boundaries of which are a given number of straight edges of equal length; a fastener secured to the plate and including an outstanding radial flange extending over the top face of the plate and a downwardly projecting stud portion passing through said hole, the stud having a rounded portion at the zone within the hole, the outer end of the stud being provided with an end with said given number of equally spaced radially projecting corner portions sufficiently long to extend over the side marginal portions of the hole and sufficiently short to pass through the corner zones of the hole, and a detent member carried on the fastener and projecting into a corner of the hole to deter rotation of the fastener.

2. In combination, a plate having a square hole therein; a fastener secured to the plate and including an upwardly extending stem provided with an outstanding radial flange extending over the top face of the plate and a downwardly projecting stud portion passing through said hole, the stud having a rounded portion at the zone within the hole, a grommet having a flange extending over the top face of the plate and four sides passing through the hole; the other end of the stud being provided with a square flat end with four equally spaced radially projecting corner portions holding said sides over the areas of the side marginal portions of the hole; the rounded portion having four frusto-conical surfaces between the flange and the respective said corner portions.

3. In combination, a plate having a square hole therein; a fastener secured to the plate and including an outstanding radial flange extending over the top face of the plate and a downwardly projecting stud portion passing through said hole, the stud having a rounded portion at the zone within the hole, a generally cubical grommet member having a flange extending over the top face of the plate and four sides passing through the hole; the grommet member being separable at a vertical edge to permit expansion, the outer end of the stud being provided with a square flat end with four equally spaced radially projecting corner portions holding said sides over the areas of the side marginal portions of the hole; the rounded portion having four frusto-conical surfaces between the flange and the respective said corner portions.

4. In combination, upper and lower plates in face-to-face contact having holes of approximately the same size and bounded by straight lines all of the same length; a fastener holding the plates together and including an upwardly extending stem provided with an outstanding radial flange extending over the top face of the upper plate and a downwardly projecting stud portion passing through said holes, the stud having a rounded portion at the zone within the holes, the outer end of the stud being provided with a flat end having equally spaced radially projecting corner portions sufficiently long to extend over the side marginal portions of the hole and sufficiently short to pass through the corner zones of the holes, the rounded portion having equally spaced partial frusto-conical surfaces between the flange and the respective said corner portions.

5. In combination a plate having a hole therein; the hole being defined by a given number of substantially straight edges, a fastener secured to the plate and including an upwardly extending stem provided with an outstanding radial flange extending over the top face of the plate and a downwardly projecting stud portion passing through said hole, the stud having a rounded portion at the zone within the hole, and a grommet having a flange extending over the top face of the plate and said given number of sides passing through the hole; the outer end of the stud being provided with a square flat end with said given number of equally spaced radially projecting corner portions holding said sides over the areas of the side marginal portions of the hole.

6. In combination, a plate having a square hole therein; a fastener secured to the plate and including an upwardly extending stem provided with an outstanding radial flange extending over the top face of the plate and a downwardly projecting stud portion passing through said hole, the stud having a rounded portion at the zone within the hole, the outer end of the stud being provided with a square flat end with four equally spaced radially projecting corner portions sufficiently long to extend over the side marginal portions of the hole and sufficiently short to pass through the corner zones of the hole, the rounded portion having a cross section having four spaced arcs as the extreme outer boundary lines of the section and between the flange and the respective said corner portions.

7. A fastener for use in combination with upper and lower plates in face-to-face contact having substantially square holes of approximately the same size; the fastener being for holding the plates together and comprising an upwardly extending stem provided with an outstanding radial flange for extending over the top face of the upper plate and a downwardly projecting stud portion for passing through said holes, the stud having an approximately cylindrical rounded portion at the zone within the holes, the maximum diameter of the rounded portion being normally slightly greater than the minimum diameter of the square holes, the outer end of the stud being provided with four equally spaced radially projecting lugs sufficiently long to extend over the side marginal portions of the hole and sufficiently short to pass through the corner zones of the holes, the stud portion being provided with a hollow cavity to increase resiliency of the stud portion, the flange being provided with circular groove opening toward the plates when the latter are engaged by the fastener, and a resilient ring in the groove.

8. In combination, a plate having a hole therein; a fastener secured to the plate and including an upwardly extending stem provided with an outstanding radial flange extending over the top face of the plate and a downwardly projecting stud portion passing through said hole, the stud portion having a rounded portion at the zone within the hole, and having a radially projecting portion extending past a margin of the hole and below said plate; and a detent on the fastener projecting into the hole and alongside the stud portion to deter rotation of the stud portion within the hole.

9. In combination, a plate having a hole therein, the substantial boundaries of the hole being a given number of substantially straight lines of equal length, all boundaries meeting at corners having substantially the same angular size; a fastener secured to the plate and including an outstanding flange extending over the top face of the plate and a downwardly projecting stud passing through said hole; the stud having a portion of circular cross section at the zone within the hole, the outer end of the stud being provided with said given number of equally spaced like radially projecting corner portions for engaging matter adjacent said boundaries and sufficiently short to pass through the corner zones of the hole in unlocked position, the stud having frusto-conical face portions between the zone of circular cross section and the outer end of the stud to provide camming surfaces.

10. In a combination as claimed in claim 9, and a grommet between the stud and the plate.

11. In a combination as claimed in claim 9, the stud being provided with an opening extending from the outer end thereof in a direction parallel with the longitudinal axis of the stud to increase the resiliency of the stud.

References Cited in the file of this patent

UNITED STATES PATENTS

| | | |
|---|---|---|
| 951,437 | Gehrke | Mar. 8, 1910 |
| 2,172,827 | Becker | Sept. 12, 1939 |
| 2,244,975 | Tinnerman | June 10, 1941 |

FOREIGN PATENTS

| | | |
|---|---|---|
| 499,304 | Great Britain | Jan. 19, 1939 |